United States Patent [19]

Kobayashi

[11] Patent Number: 5,071,396
[45] Date of Patent: Dec. 10, 1991

[54] TORQUE DISTRIBUTION CONTROL SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 541,768

[22] Filed: Jun. 21, 1990

[30] Foreign Application Priority Data

Jul. 20, 1989 [JP] Japan .................. 1-189997

[51] Int. Cl.⁵ .......................... B60K 17/348
[52] U.S. Cl. ................... 475/249; 475/221; 475/86; 180/248; 180/249
[58] Field of Search ........ 180/248, 249, 250; 475/221, 248, 249, 84, 86

[56] References Cited

U.S. PATENT DOCUMENTS

| | | | |
|---|---|---|---|
| 4,441,575 | 4/1984 | Suzuki | 475/221 X |
| 4,457,394 | 7/1984 | Suzuki | 475/221 |
| 4,476,952 | 10/1984 | Suzuki | 475/221 |
| 4,589,304 | 5/1986 | Ashikawa et al. | 475/249 X |
| 4,693,334 | 9/1987 | Hiraiwa | 180/249 |
| 4,763,749 | 8/1988 | Miura et al. | 180/249 |
| 4,779,699 | 10/1988 | Hatano | 180/248 |
| 4,817,753 | 4/1989 | Hiketa | 180/249 |
| 4,825,368 | 4/1989 | Itoh et al. | 180/249 X |
| 4,840,247 | 6/1989 | Kashihara et al. | 180/249 |
| 4,866,625 | 9/1989 | Kawamoto et al. | 180/249 |
| 4,912,639 | 3/1990 | Kawamoto et al. | 180/248 |
| 4,969,532 | 11/1990 | Oyama et al. | 180/248 X |
| 4,974,696 | 12/1990 | Miyajima et al. | 475/86 X |

FOREIGN PATENT DOCUMENTS

| | | | |
|---|---|---|---|
| 0247008 | 11/1987 | European Pat. Off. | 475/221 |
| 63-176728 | 7/1988 | Japan . | |

*Primary Examiner*—Allan D. Herrmann
*Assistant Examiner*—Matthew Stavish
*Attorney, Agent, or Firm*—Martin A. Farber

[57] ABSTRACT

A central differential comprising a planetary gear device is coaxially mounted on one of the axles of a motor vehicle. The planetary gear device comprises a first sun gear connected to an output shaft of a transmission, a carrier, first and second planetary pinions integral with each other and rotatably supported on the carrier, and a second sun gear. The first planetary pinion is engaged with the first sun gear, and the second planetary pinion is engaged with the second sun gear. A fluid-operated multiple-disk clutch is disposed so as to restrict the differential operation of the planetary gear device.

11 Claims, 15 Drawing Sheets

TORQUE DISTRIBUTION CONTROL SYSTEM FOR A FOUR-WHEEL DRIVE MOTOR VEHICLE

BACKGROUND OF THE INVENTION

The present invention relates to a torque distribution control system for a four-wheel drive motor vehicle having a central differential, and more particularly to the system for a vehicle with a laterally mounted engine.

In the four-wheel drive motor vehicle, a torque distribution ratio of front wheels and rear wheels is determined to coincide with a dynamic weight ratio of the front and rear wheels, so that power of the engine is effectively used at acceleration.

In the four-wheel drive motor vehicle based on a front-wheel drive with a front-mounted engine which has a static weight ratio of 60 (front):40 (rear), the ratio between the front torque $T_F$ to the front wheels and the rear torque $T_R$ to the rear wheels is determined in the ratio of 50:50 which is same as the dynamic weight ratio thereof. In the four-wheel drive motor vehicle based on a rear-wheel drive with a front-mounted engine which has the static weight ratio of 50:50, the ratio of the front torque $T_F$ and the rear torque is determined 40:60 in the same ratio as the dynamic weight ratio. Accordingly, the central differential comprising bevel gears is employed in the former vehicle in which the output torque of the engine is equally distributed, and the central differential having a simple planetary gear device is employed in the latter vehicle.

The former vehicle ensures safe driving on a slippery road. If a differential lock device is provided for locking the central differential, the driving force of the vehicle is improved. However, the steering ability of the vehicle is not particularly improved. That is, when the vehicle makes a turn at high speed under the differential lock condition, all of the four wheels may slip (slipping spin) at the same time, causing difficulty in driving.

In order to ensure driving stability of the vehicle, the torque to the rear wheels is set to a value larger than that to the front wheels by arranging the central differential comprising the simple planetary gear device, so that the rear wheels may slip first. Thus, the vehicle can be safely driven by the front wheels at a small torque while the rear wheels idle.

Japanese Patent Application Laid-Open 63-176728 discloses a four-wheel drive motor vehicle in which a central differential comprising a simple planetary gear device is provided. The output of a transmission is transmitted to a carrier of the planetary gear device. The torque is distributed to the front wheels through either one a sun gear or a ring gear and to the rear wheels through the other one. The torque to the front and rear wheels is unequally distributed at the ratio determined by the difference between pitch circles of the sun gear and the ring gear. A fluid-operated multiple-disk friction clutch as a lock device is provided for controlling differential operation. A standard torque distribution ratio determined by the ratio of the pitch circles can not be changed, the unless diameters of the sun gear and the ring gear changes.

In order to increase the standard torque distribution ratio, the diameter of the sun gear is decreased or that of the ring gear is increased. However, in a power transmitting system where an axle differential for the front or rear axles and the central differential are coaxially disposed, a plurality of shafts such as axles, a front drive shaft, an input shaft connected to the transmission and a rear drive shaft are disposed, penetrating the sun gear. Therefore, the diameter of the sun gear cannot be decreased. On the other hand, the ring gear cannot be enlarged because of limitation of space and of a required gear ratio. Consequently, the power transmitting system cannot be applied to various vehicles having a different static weight ratio, such as a front-wheel drive vehicle with a front-mounted engine, and a rear-wheel drive vehicle with a rear-mounted and mid-shipped engine.

Moreover, since the distribution of torque to the rear wheels can not be set to the large value, a control range of the multiple-disk friction clutch becomes small. Consequently, the vehicle can not be provided with good driveability and steerability.

SUMMARY OF THE INVENTION

An object of the present invention is to provide a torque distribution control system for a four-wheel drive motor vehicle having a laterally mounted engine, in which a standard torque ratio of the front wheels and rear wheels can be easily changed.

Another object of the present invention is to provide a system in which a large torque is distributed to the rear wheels, thereby enabling control of a wide torque distribution range with a fluid-operated friction clutch.

According to the present invention, there is provided a system for controlling the torque distributed to the front wheels and a rear wheels of a motor vehicle having the laterally mounted engine and a laterally mounted transmission, and a central differential disposed coaxially with an axle differential for axles of the vehicle selected from the front or rear axles.

The system comprises a central differential having a planetary gear device including a first sun gear connected to an output shaft of a transmission, a carrier, first and second planetary pinions integral with each other and rotatably supported on the carrier, and a second sun gear, the first and second sun gears being coaxial with selected axles, the first planetary pinion being engaged with the first sun gear, and the second planetary pinion being engaged with the second sun gear, a first torque transmitting member connecting the carrier with an axle transmission, a second torque transmitting member connecting the second sun gear with axles other than the selected axles, a fluid-operated multiple-disk clutch disposed between the first and second torque transmitting members so as to restrict differential operation of the planetary gear device, and control means for controlling the clutch torque of the multiple-disk clutch in accordance with driving conditions of the vehicle.

In an aspect of the invention, the first torque transmitting member is a first tubular output shaft rotatably mounted on one of the selected axles, and the planetary gear device is arranged such that a torque larger than the torque to the front wheels is transmitted to the rear wheels.

In another aspect, the control means comprises a hydraulic circuit for supplying pressurized oil to the fluid operated multiple-disk clutch, and a control unit for controlling the pressure of oil supplied to the clutch.

The hydraulic circuit comprises an oil pump, a pressure regulator valve for regulating the pressure of the oil supplied from the oil pump to produce a line pressure, and a clutch control valve for controlling the oil supplied to the clutch, and a solenoid-operated duty control valve for controlling the pressure of the oil supplied to the clutch control valve, the control unit comprising a slip ratio calculator for calculating a slip ratio between the rear wheels and the front wheels in accordance with the ratio between front-wheel speed and rear-wheel speed, clutch pressure setting means responsive to the slip ratio for providing a clutch pressure, and duty ratio providing means responsive to the clutch pressure for producing pulses having a duty ratio corresponding to the clutch pressure which are applied to the duty control valve for controlling the pressure of the oil.

The other objects and features of the present invention will become understood from the following description with reference to the accompanying drawings.

BRIEF DESCRIPTION OF DRAWINGS

FIGS. 11a to 11i are schematic diagrams showing other examples of the central differential.

DETAILED DESCRIPTION OF THE PREFERRED EMBODIMENTS

Figure 1A:
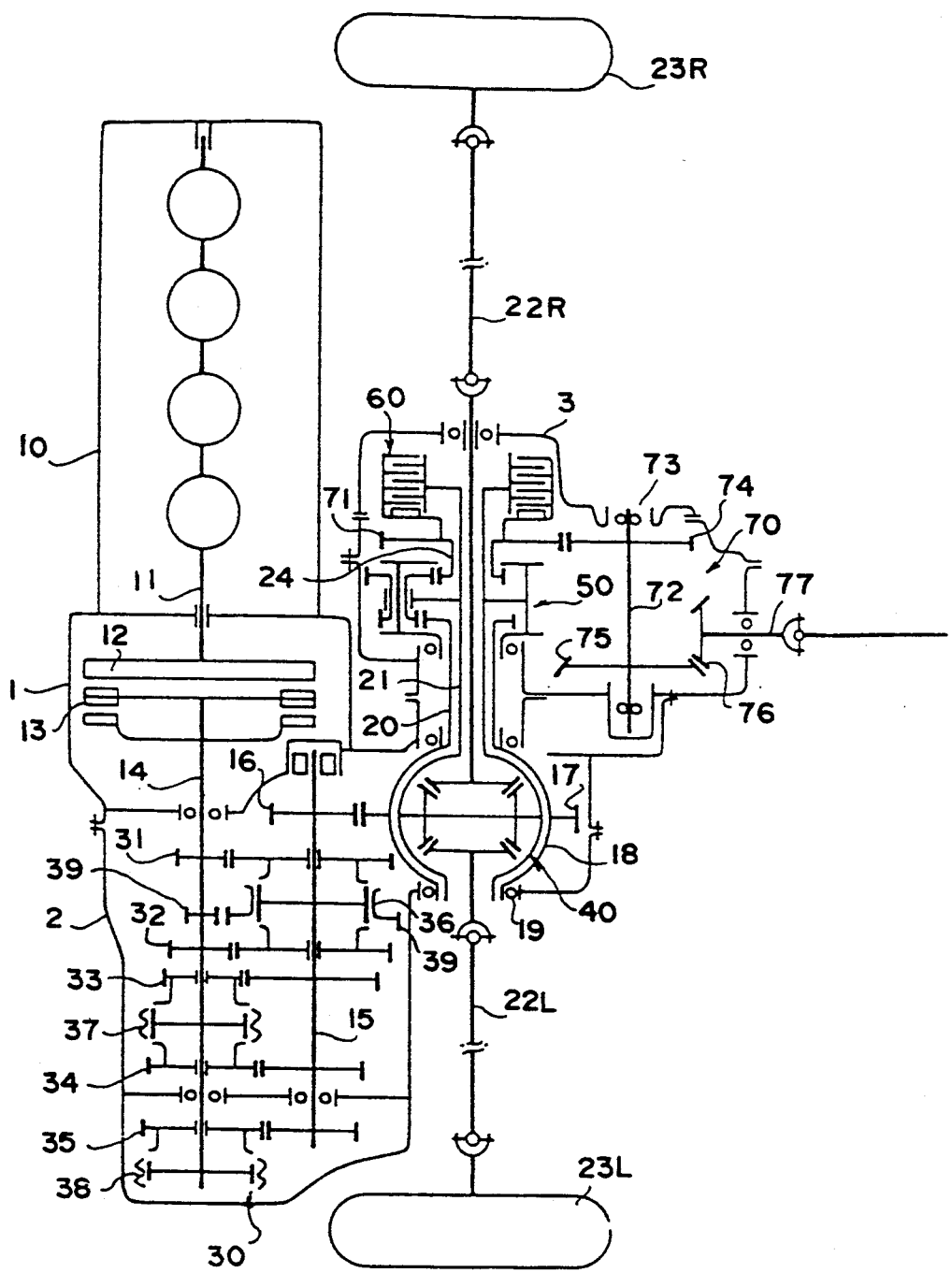
FIGS. 1a and 1b show a schematic diagram of a power transmission system for a four-wheel drive motor vehicle according to the invention.
Figure 1B:
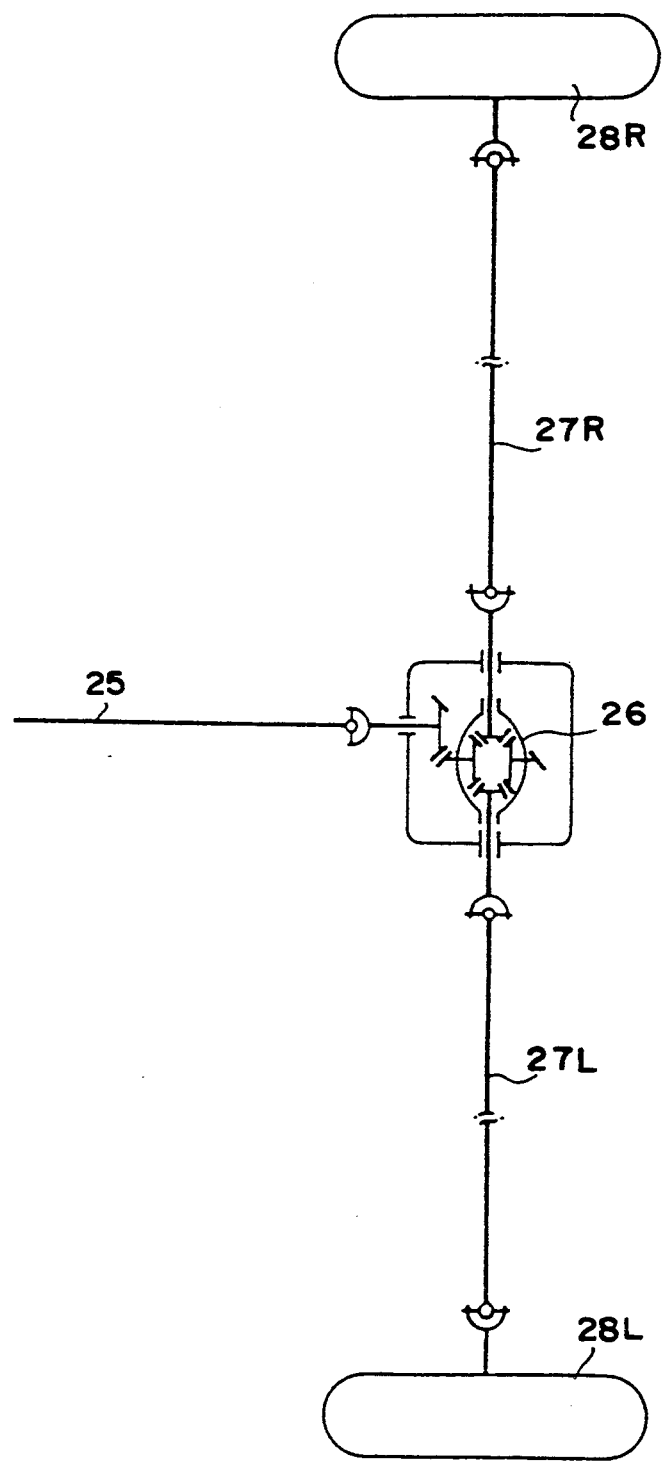

FIGS. 1a, 1b, 2a and 2b show a power transmission system for a four-wheel drive motor vehicle to which the present invention is applied. An engine 10 is laterally mounted on the motor vehicle at a front portion thereof. The power transmission system comprises a clutch 13 connected to the engine 10 through a crankshaft 11 and a flywheel 12 and housed in a clutch housing 1, a manual transmission 30 and a front axle differential 40 housed in a transmission case 2 and a transfer device 70, a central differential 50 and a fluid operated multiple-disk clutch 60 housed in a transfer case 3. The transmission 30 has an input shaft 14, an output shaft 15 parallel with the input shaft 14, five pairs of change-speed gears 31 to 35 corresponding to first to fifth (overdrive) speed gears, and synchronizers 36 to 38. The synchronizers 36 to 38 are disposed between the gears 31 and 32, between 33 and 34 and adjacent the gears 35, respectively. A reverse drive gear 39 mounted on the input shaft 14 meshes with a gear formed on one side of a sleeve of the synchronizer 36 through an idler gear (not shown) for reverse drive.

A drive gear 16 fixedly mounted on the output shaft 15 meshes with a final gear 17 which is fixed to flanges of opposed hub members 18 by bolts (FIG. 2a) at an inner periphery of the gear 17. The hub member 18 is rotatably supported in the clutch housing 1 and the transmission case 2 through bearings 19. The front axle differential 40 is disposed inside the hub members 18.

Figure 2A:
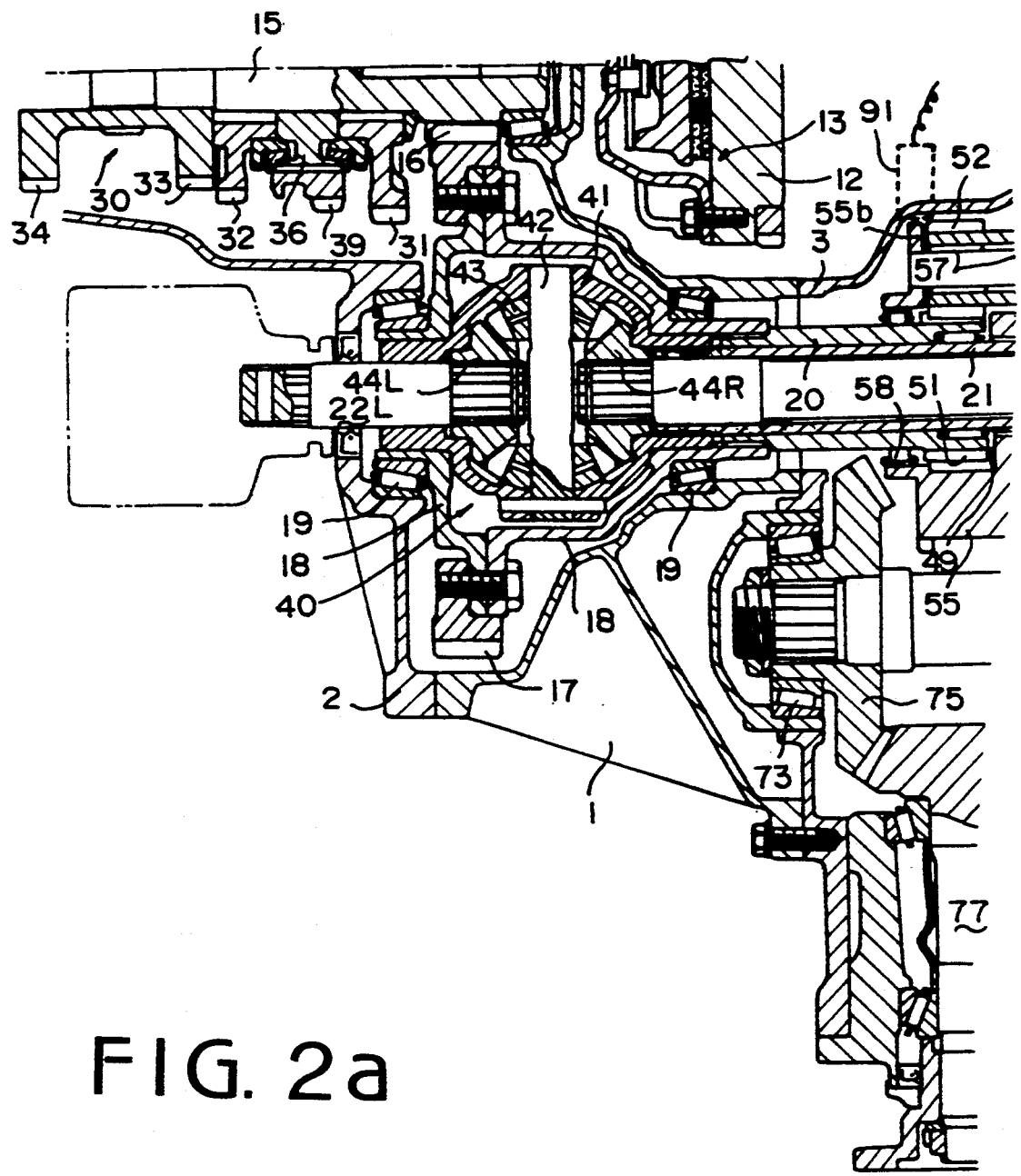
FIGS. 2a and 2b show an enlarged sectional view of a central of the system.
Figure 2B:
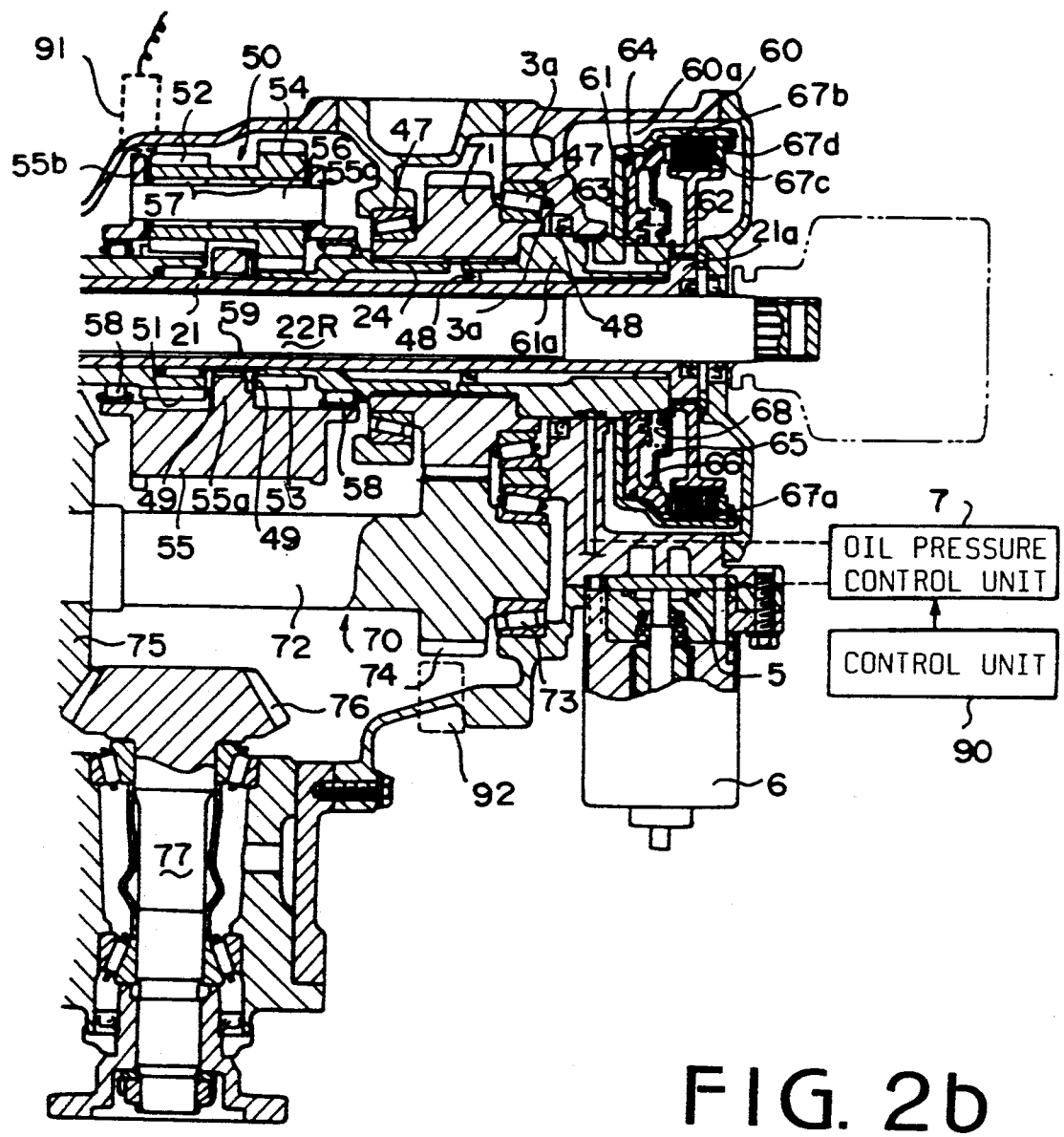

As shown in FIGS. 2a and 2b, the front axle differential 40 with a bevel gear has a differential case 41 connected to a first tubular output shaft 21 of the central differential 50. In the differential case 41, there are provided a pinion shaft 42 secured to the differential case 41, two differential pinions 43 rotatably mounted on the pinion shaft 42 and two bevel side gears 44L, 44R meshed with pinions 42. The side gears 44L and 44R are connected to left and right front axles 22L and 22R so as to respectively transmit the output power of the transmission to the left and right front wheels 23L, 23R and to absorb a difference of speeds therebetween.

In the transfer case 3, the central differential 50 and the fluid operated multiple-disk clutch 60 are provided coaxially to the front differential 40 and the axle 22R, and the transfer device 70 is disposed behind the central differential 50.

The central differential 50 is a complex planetary gear device and has a tubular input (hollow shaft) 20 connected with the hub member 18, and a tubular second output shaft 24 rotatably mounted on the first output shaft 21. The first output shaft 21 is rotatably mounted on the right front axle 22R. The central differential 50 comprises a first sun gear 51 integrally formed on the input shaft 20, three first planetary pinions 52 meshed with the first sun gear 51, a second sun gear 53 integrally formed on the second output shaft 24, three second planetary pinions 54 meshed with the second sun gear 53, and a carrier 55.

Figure 3:
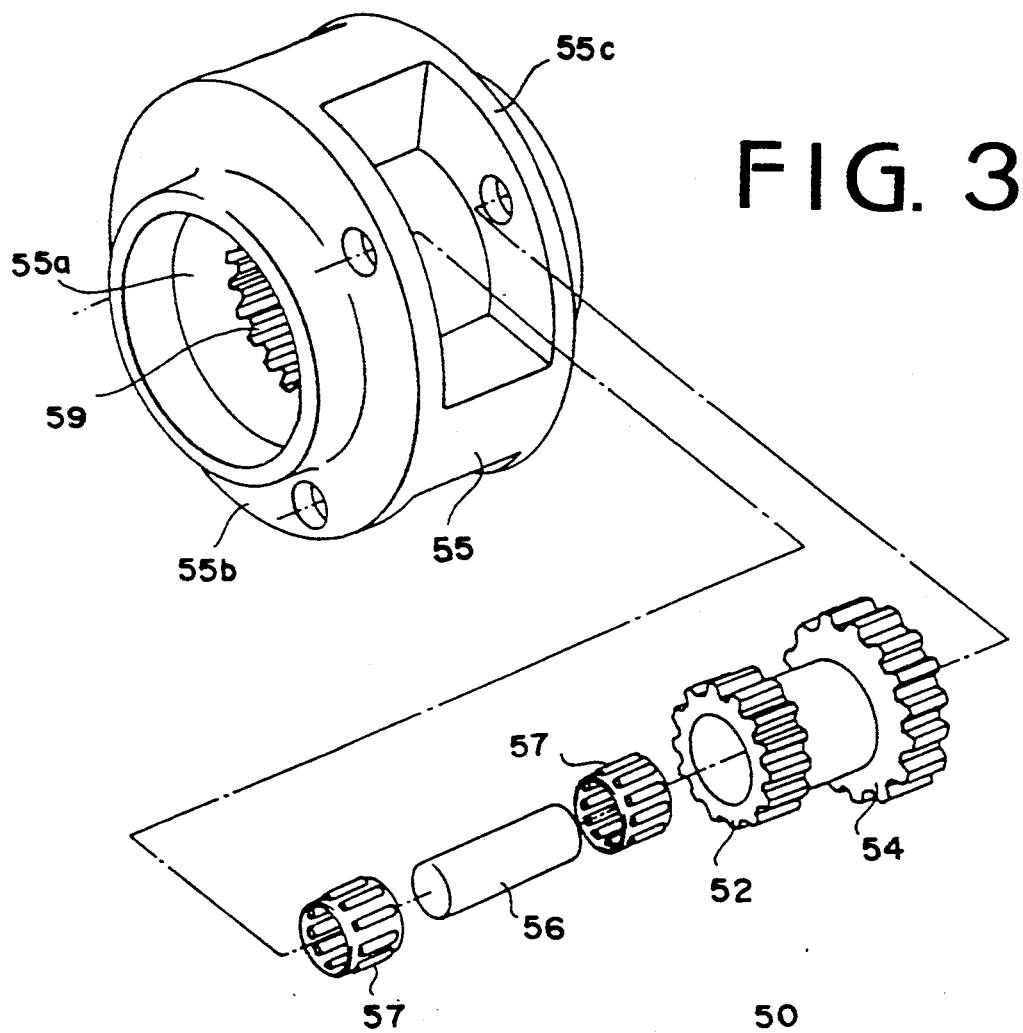
FIG. 3 a perspective view showing a carrier and pinions in the central differential.

Referring to FIG. 3, the carrier 55 has a boss 55a, and annular flange portions 55b and 55c integral with the boss 55a. Each of the flange portions 55b and 55c has three holes. Corresponding holes rotatably support a pin 56. The pinions 52 and 54 are integral with each other and rotatably mounted on the pin 56 through needle bearings 57. The boss 55a is engaged with the input shaft 20 through a thrust bearing 49 and splined to the first output shaft 21 through splines 59. The flange portions 55b and 55c are rotatably mounted on the input shaft 20 and the second output shaft 24 through needle bearings 58, respectively.

Thus, the output torque from the output shaft 15 of the transmission 30 is transmitted to the first sun gear 51 through the drive gear 16, the final gear 17, the hub member 18 and the input shaft 20 and further to the carrier 55 and the second sun gear 53 through the pinions 52, 54 at predetermined respective torque distribution ratios. The difference between rotating speeds of the carrier 55 and the second sun gear 53 is absorbed by the rotation and revolution of the first and the second planetary pinions 52 and 54.

Figure 4:
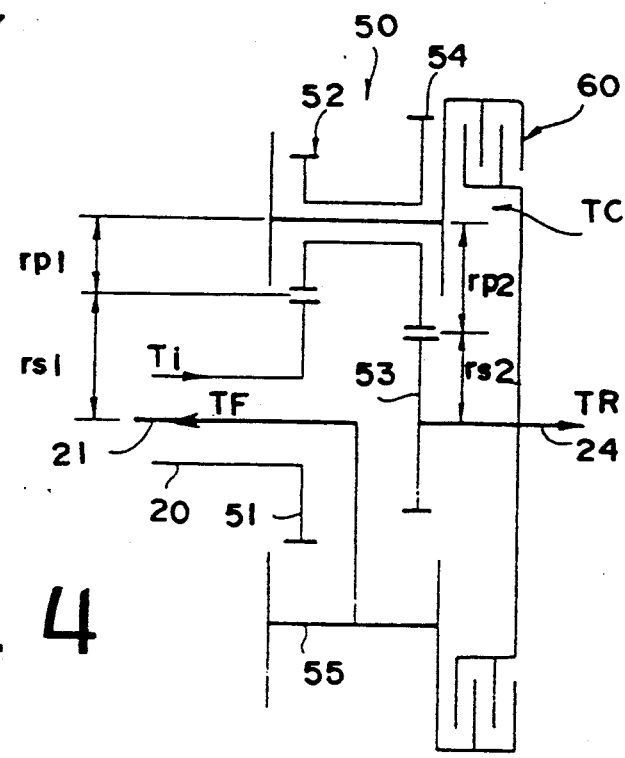
FIG. 4 is a schematic view showing the central differential.

The operation of the central differential 50 for distributing the torque to the front wheels 23L, 23R and rear wheels 28L, 28R will be described hereinafter with reference to FIG. 4.

Input torque Ti of the first sun gear 51 and the relationship between the sun gears 51 and the pinions 52, 54 are expressed as follows, respectively.

$$T_i = T_F + T_R \quad (1)$$

$$rs_1 + rp_1 = rs_2 + rp_2 \quad (2)$$

where $T_F$ is a front torque transmitted from the carrier 55 to the first output shaft 21, $T_R$ is rear torque transmitted from the second sun gear 53 to the second output shaft 24, $rs_1$ is the radius of a pitch circle of the first sun gear 51, $rp_1$ and $rp_2$ the radii of the pitch circles of the first and second pinions 52 and 54, respectively, and $rs_2$ is the radius of the pitch circle of the second sun gear The tangential load P on an engaging point of the first sun gear 51 and the first pinion 52 is equal to the sum of the tangential load $P_1$ on the carrier 55 and the tangential load $P_2$ on the engaging point of the second sun gear 53 and the second pinion 54. That is, $$P = T_i/rs_1$$

$$P_1 = T_F/(rs_1 + rp_1)$$

$$P_2 = T_R/rs_2$$

$$T_i/rs_1 = \{(T_F/(rs_1+rp_1))\} + T_R/rs_2 \quad (3)$$

Substituting equations (1) and (2) for the equation (3), $$T_F = (I - rp_1 \cdot rs_2 / rs_1 \cdot rp_2) \cdot T_i$$

$$T_R = (rp_1 \cdot rs_2 / rs_1 \cdot rp_2) \cdot T_i$$

Consequently, it will be seen that the torque distribution for the front torque $T_F$ and the rear torque $T_R$ can be set to various values by changing the radii of the pitch circles of the sun gears 51 and 53 and the pinions 52 and 54.

If $rs_1$ is 23.5 mm, $rp_1$ is 16.5 mm, $rp_2$ is 18.8 mm and $rs_2$ is 211 mm, respectively, the front torque $T_F$ and the rear torque $T_R$ are calculated as $$T_F = 20/53 \cdot T_i$$

$$T_R = 33/53 \cdot T_i$$

Thus, the torque distribution ratio of the front wheels 23L, 23R and the rear wheels 28L, 28R is $$T_F : T_R \approx 38 : 62$$

A large torque can be distributed to the rear wheels 28L, 28R.

The clutch 60 comprises a sleeve 61a splined to an inner periphery of a transfer drive gear 71 and supported by a partition 3a, a drive drum 61 secured on the sleeve 61a, a driven drum 62 splined to a flange 21a formed at the end portion of the first output shaft 21, a plurality of disks 67a splined on the drum 61, and a plurality of disks 67b splined on the drum 62, the disks on the respective drums being alternately arranged. A retainer 67c is abuts the innermost disk 67a by a snap ring 67d secured to the drum 61. A piston 64 is provided in the drum 61 and slidably mounted on a hub of the drum 62. An oil chamber 63 is formed between the piston 64 and the drum 61. The transfer drive gear 71 of the transfer device 70 is securely mounted on the second output shaft 24 and rotatably mounted in the transfer case 3 through bearings 47. Thus, the clutch 60 is provided between the carrier 55 and the second sun gear 53 so as to change the torque distribution ratio and to lock the central differential 50.

When oil is supplied to the chamber 63, the piston 64 is pushed by the pressure of the oil. The piston 64 pushes the disks 67a and 67b to engage the clutch 60 for producing a clutch torque.

A cylindrical retainer 65 is disposed in a space between the piston 64 and the driven drum 62. The retainer 65 is mounted on a hub of the drum 62 and slidably engaged with an inner periphery of the piston 64. Thus, the retainer 65 is water-tightly (sealingly) mounted between the drum 62 and the piston 64, thereby defining a centrifugal oil pressure chamber 66, opposite to the oil chamber 63. A return coil spring 68 is provided in the chamber 66 between the piston 64 and the retainer 65, thereby canceling centrifugal force exerted on the piston 64 upon rotation of the drum 62.

The oil for the transmission 30 is different from the oil for the clutch 60. Thus, oil seals 48 are disposed between the partition 3a of the transfer case 3 and the sleeve 61a of the drive drum 61 and between the sleeve 61a and the first output shaft 21 to separate the oil for lubricating the transmission 30 from the oil for operating the clutch 60 by the partition 3a.

An oil pump 5 is provided on the partition 3a adjacent the clutch 60 for supplying the oil to the clutch 60. The oil pump 5, is for example, driven by a motor 6 powered by a battery and connected to an oil pressure control unit 7 provided in the transfer case 3 to be applied with electric pulses from a control unit 90 to control the clutch 60.

The transfer drive gear 71 engages with a driven gear 74 securely mounted on a transfer shaft 72 of the transfer device 70 which is disposed behind the central differential 50. The transfer shaft 72 is connected to a rear drive shaft 77 perpendicular to the transfer shaft 72 through a pair of bevel gears 75, 76, thereby transmitting the power to rear axles 27L and 27R by way of the rear drive shaft 77, a propeller shaft 25 and a rear differential 26.

Figure 5:
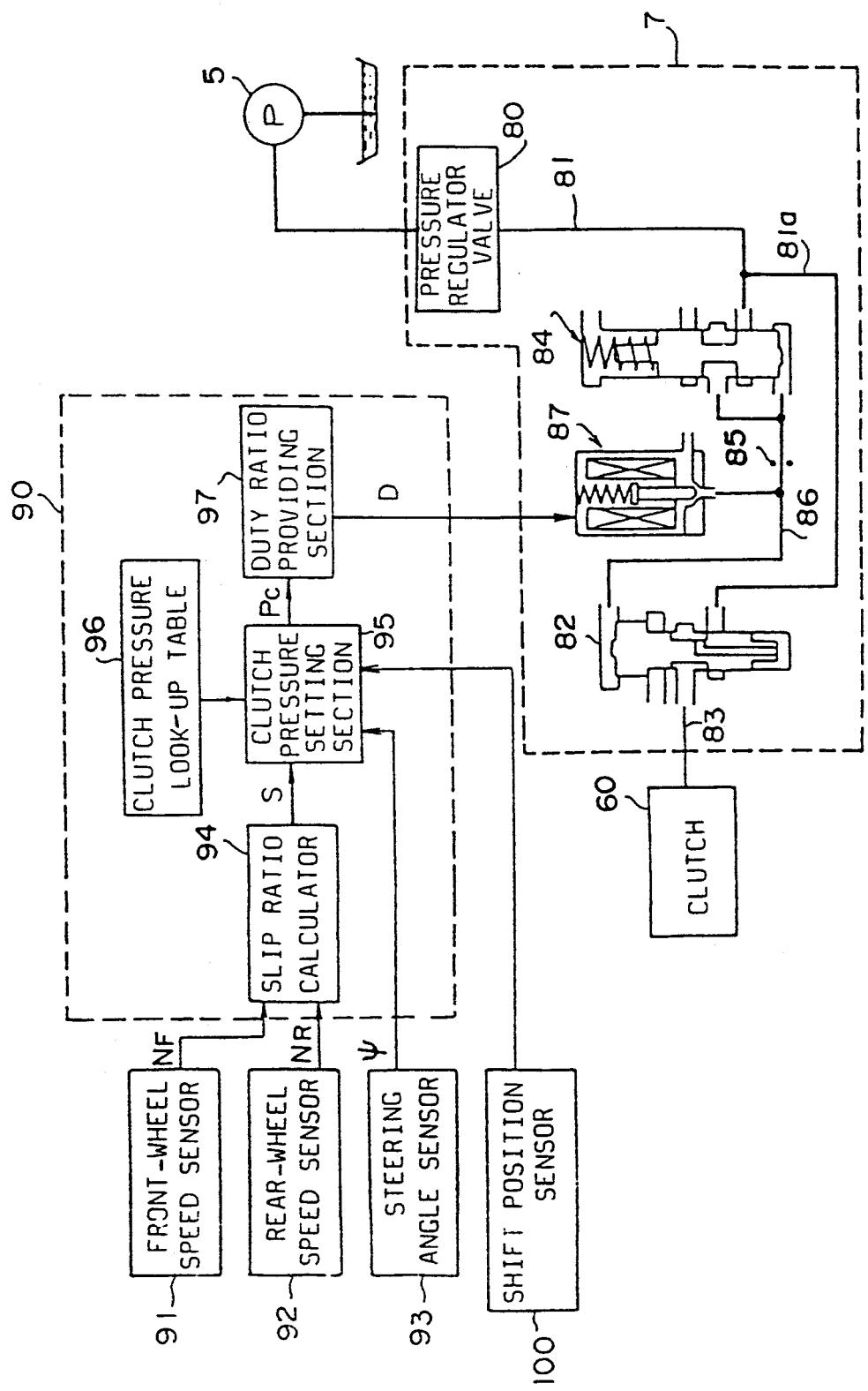
FIG. 5 is a circuit showing a control system for a hydraulic clutch provided in the central differential.

Referring to FIG. 5 showing a control system for the clutch 60, the oil pressure control unit 7 of the control system comprises a pressure regulator valve 80, a pilot valve 84, a clutch control valve 82 and a solenoid operated duty control valve 87. The regulator valve 80 operates to regulate the pressure of oil supplied from the oil pump 5 driven by the engine to produce a predetermined line pressure and a lubricating oil pressure. An actuating pressure conduit 81 is communicated with a passage 86 through the pilot valve 84. The passage 86 is communicated with the solenoid operated duty control valve 87 downstream of an orifice 85, and with an end port of the clutch control valve 82. The conduit 81 is communicated with the clutch control valve 82 through a passage 81a. The clutch control valve 82 is communicated with the clutch 60 through the passage 83. The solenoid-operated valve 87 is operated by pulses from a control unit 90 at a duty ratio determined therein, so as to control the draining of the oil to provide a control pressure. The control pressure is applied to an end of a spool of the clutch control valve 82 to control the oil supplied to the clutch 60 so as to control the clutch pressure (torque).

The control unit 90 is supplied with an output signal from a front-wheel speed sensor 91, a rear-wheel speed sensor 92, a steering angle sensor 93 and a shift position sensor 100 for detecting the shift position of the automatic transmission 30. As shown in FIG. 2b, the front-wheel speed sensor 91 is provided on the transfer case 3 opposite to the carrier 55 of the central differential 50 and the rear-wheel speed sensor 92 is provided opposite to the drive gear 74 mounted on the transfer shaft 72.

The control unit 90 has a slip ratio calculator 94 to which the front-wheel and rear-wheel speeds NF and NR are applied. Since the standard torque distribution is determined in accordance with the principle of $T_F < T_R$, the rear wheels slip first (slipping spin). A slip ratio S is calculated in accordance with the ratio between the front-wheel speed $N_F$ and the rear-wheel speed $N_R$, $S = N_F N_R (S>0)$. The slip ratio S, a steering angle $\psi$, and a shift position signal from the sensors 93 and 100 are applied to a clutch pressure setting section 95. In accordance with the input signals, the clutch pressure setting section 95 retrieves a clutch pressure Pc from a clutch pressure look-up table 96.

Figure 6:
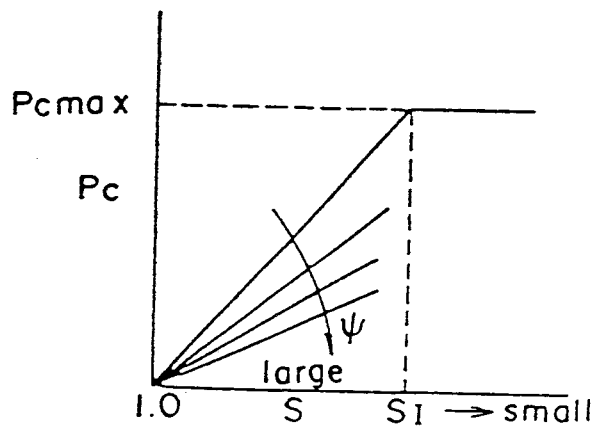
FIG. 6 is a graph showing a clutch pressure look-up table.

FIG. 6 shows clutch pressures stored in the look-up table 96. When the slip ratio S is $S \geq 1$, which means that the rear wheels 28L, 28R do not slip, the clutch pressure Pc is set to a small value. When the rear wheels 28L, 28R slip and the slip ratio S becomes $S<1$, the clutch pressure Pc (clutch torque) increases with a decrease of the slip ratio S. When the slip ratio S becomes smaller than a set value SI, the clutch pressure Pc is set to a maximum Pcmax. Further, when the steering angle $\psi$ increases, the clutch pressure Pc is decreased, thereby preventing tight corner braking.

The clutch pressure Pc is applied to a duty ratio providing section 97 where a duty ratio D corresponding to the derived clutch pressure Pc is provided. A duty signal with a duty ratio D provided at the section 97 is applied to the solenoid-operated duty control valve 87.

Figure 8:
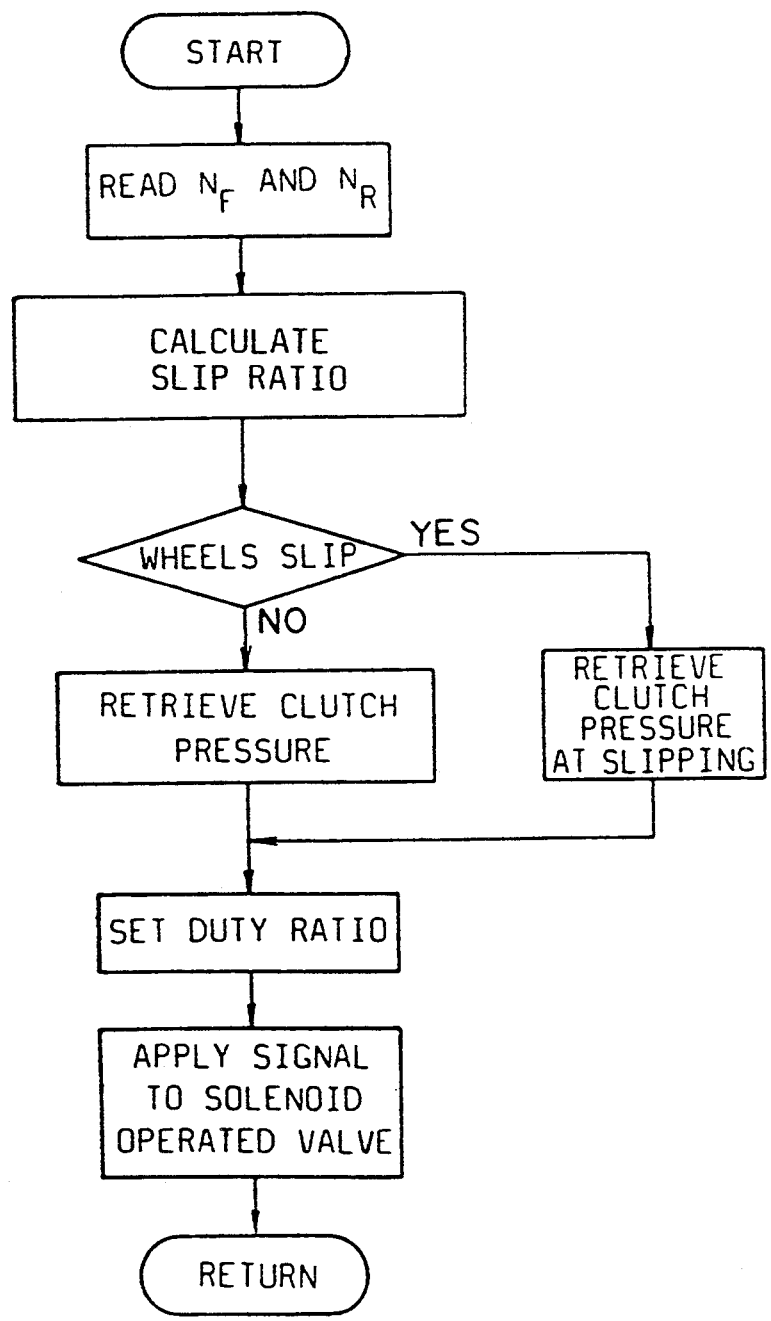
FIG. 8 a flowchart showing an operation of a control unit in the control system.
Figure 9A:
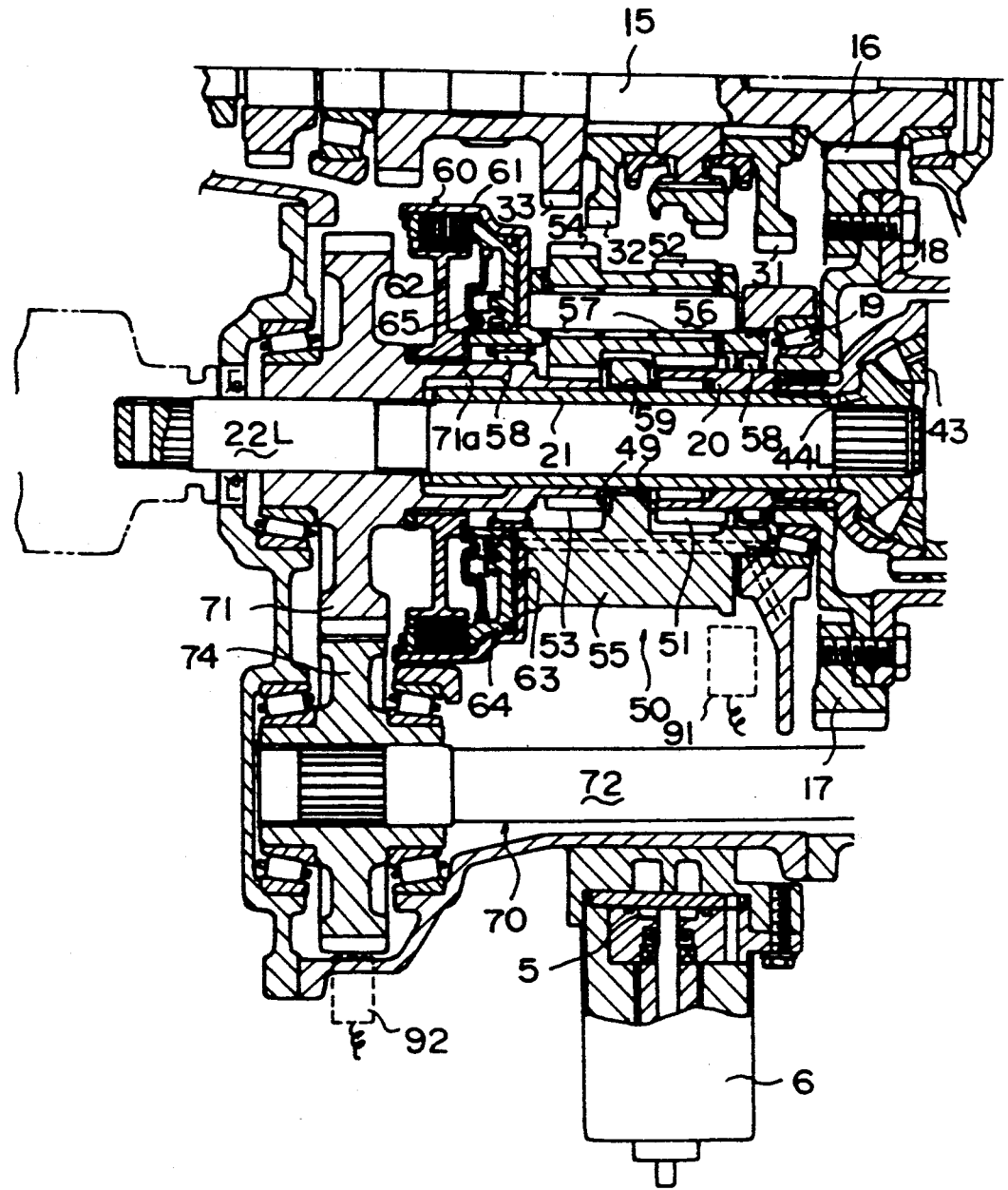
FIGS. 9a an 9b show a sectional view of the central differential and a fluid operated multiple-disk clutch in a second of invention.
Figure 9B:
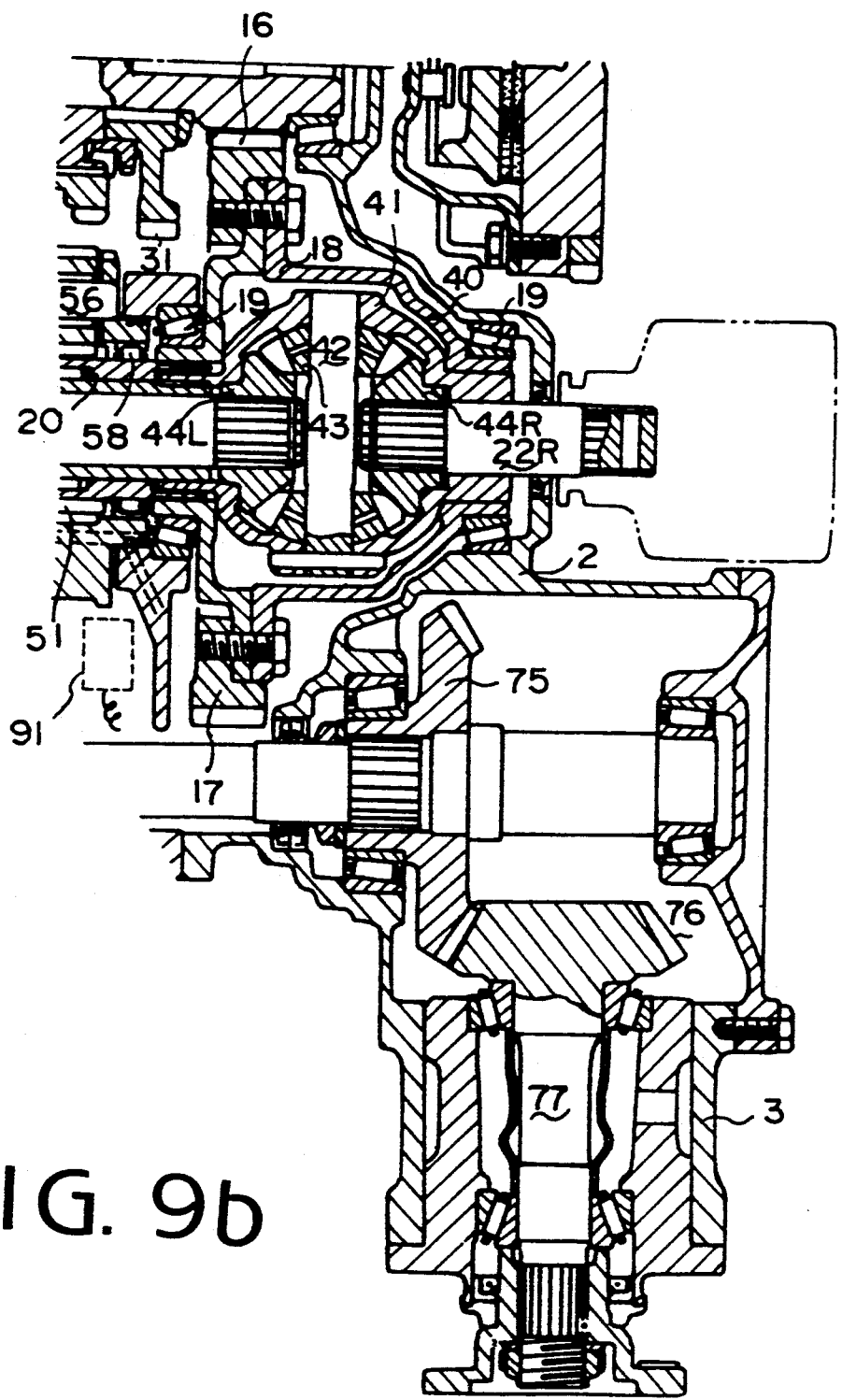

FIG. 8 is a flowchart showing the operation of the control unit 90.

As aforementioned, the front-wheel speed $N_F$ and the rear-wheel speed $N_R$ are detected and slipping of the front wheels 23L, 23R against the rear wheels 28L, 28R is calculated. If the slip ratio is smaller than the set value, a differential operation restricting clutch torque is derived from a look-up table in accordance with a throttle opening degree, vehicle speed, shift position and steering angle. The duty ratio corresponding to the derived clutch torque is applied to the solenoid operated valve 87. When the slip is larger than the set value, a clutch torque is derived from the look-up table 96 for operating the valve 87 at slipping.

Describing the operation of the system, the power of the engine 10 is transmitted through the clutch 13 to the manual transmission 30 at which the transmission ratio is controlled. The output of the transmission is transmitted to the first sun gear 51 of the central differential 50 through the output shaft 15, the drive gear 16, the final gear 17, the hub members 18 and the input shaft 20. The front torque TF and the rear torque TR are determined in accordance with the radii of the gears of the central differential 50. The torque is transmitted to the carrier 55 at a ratio, for example 38% and to the second sun gear 53 at a ratio, for example 62%.

If a no slip state is detected in the control unit 90 while a vehicle is driven on the dry road ($S \geq 1$), a signal corresponding to the duty ratio of 100% is applied from the duty ratio providing section 97 to the solenoid-operated duty control valve 87. Thus, the clutch control pressure becomes zero and the clutch control valve 82 operates to close the passage 81a, thereby draining the oil from the clutch 60. The clutch 60 is disengaged and the clutch torque becomes zero so as to render the central differential 50 free.

Accordingly, the torque of the carrier 55 is transmitted to the front wheels 23L, 23R through the first output shaft 21, front differential 40 and the axles 22L and 22R at the ratio 38%. The torque at a distribution ratio of 62% is transmitted to the rear wheels 28L, 28R through the second sun gear 53, the second output shaft 24, the transfer drive and driven gears 71 and 74, the transfer shaft 72, the bevel gears 75 and 76, the rear drive shaft 77, the propeller shaft 25, the rear differential 26 and the rear axles 27 and 27R. Thus, full-time four-wheel driving is established.

At a standard torque distribution ratio, the vehicle is driven under an understeering condition, so that good operability of the vehicle is ensured. Further, the vehicle smoothly negotiates a sharp corner due to the differential operation of the central differential 50.

Figure 7A:
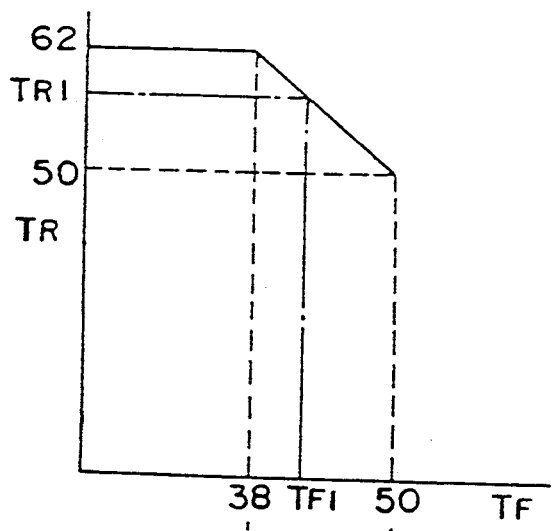
FIG. 7a is a graph showing a relationship between front torque and rear torque.
Figure 7B:
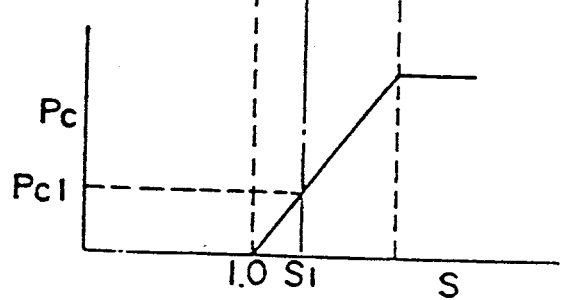
FIG. 7b is graph showing characteristics of a clutch pressure in with a slip ratio.

If the vehicle is driven on a slippery road, the rear wheels 28L, 28R slip first because a larger amount of the torque is distributed to the rear wheels 28L, 28R. The slip ratio $S_1$ is calculated at the slip ratio calculator 94 of the control unit 90. A duty signal corresponding to a clutch pressure $Pc_1$ in accordance with the slip ratio $S_1$ ($S<1$) is applied to the solenoid-operated valve 87. The clutch control valve 82 is operated by the control pressure of the oil obtained by regulating the line pressure at the solenoid-operated valve 87, so that the clutch 60 is engaged at the clutch pressure $Pc_1$. Consequently, the clutch torque Tc is produced in the clutch 60. The clutch 60 is provided in parallel with the carrier 55 and the second sun gear 53 of the central differential 50. Accordingly, the clutch torque Tc is transmitted from the second sun gear 53 to the carrier 55 to increase the torque to the front wheels 23L, 23R. Thus, the distribution ratio between the front torque and the rear torque $T_F:T_R$ becomes $TF_1: TR_l$, respectively, as shown in FIGS. 7a and 7b. To the contrary, the torque to the rear wheels 28L, 28R is reduced to eliminate slipping, thereby improving driveability to ensure good operability and safe driving.

When the slip ratio S becomes smaller than the set value SI, the differential operation restricting torque becomes maximum by the pressure of oil in the clutch 60. Thus, the carrier 55 is directly engaged with the second sun gear 53 to lock the central differential 50. Thus, the four-wheel driving is established in accordance with the torque distribution corresponding to axle loads of the front and rear wheels 23L, 23R, 28L, 28R. Thus, the torque distribution is continuously controlled in accordance with the slip condition for preventing the slipping of the wheels.

When the vehicle makes a turn, the clutch torque of the clutch 60 is decreased in accordance with the steering angle $\psi$, so that the differential limit operation of the central differential 50 is decreased to sufficiently absorb the rotational difference in the speeds of the front and rear wheels 23L, 23R, 28L, 28R, thereby preventing tight corner braking and ensuring good operability.

FIGS. 9a, 9b and 10a, 10b show second and third embodiments of the present invention. In the second embodiment shown in FIGS. 9a and 9b, the central differential 50 is disposed behind the manual transmission 30. The central differential 50 is coaxially provided with the front differential 40 on the left axle 22L directly behind the change speed gears 31 to 34. The first sun gear 51 is securely mounted on the input shaft 20 connected to the hub member 18, and the first output shaft 21 supporting the carrier 55 is connected to the differential case 41 of the front differential 40. In the present embodiment, the second output shaft 24 in the first embodiment is omitted. The drive gear 71 is rotatably mounted on the left axle 22L and has a sleeve 71a on which the second sun gear 53 is securely mounted. The drive drum 61 of the clutch 60 is connected to the carrier 55 at the left side thereof and the driven drum 62 is splined on the sleeve 71a. The transfer shaft 72 is extended from the transmission case 2 to the transfer case 3 wherein the bevel gears 75 and 76 are provided. The oil pump 5 is mounted on the transmission case 2. Other construction and operation of the second embodiment are the same as those of the first embodiment.

Figure 10A:
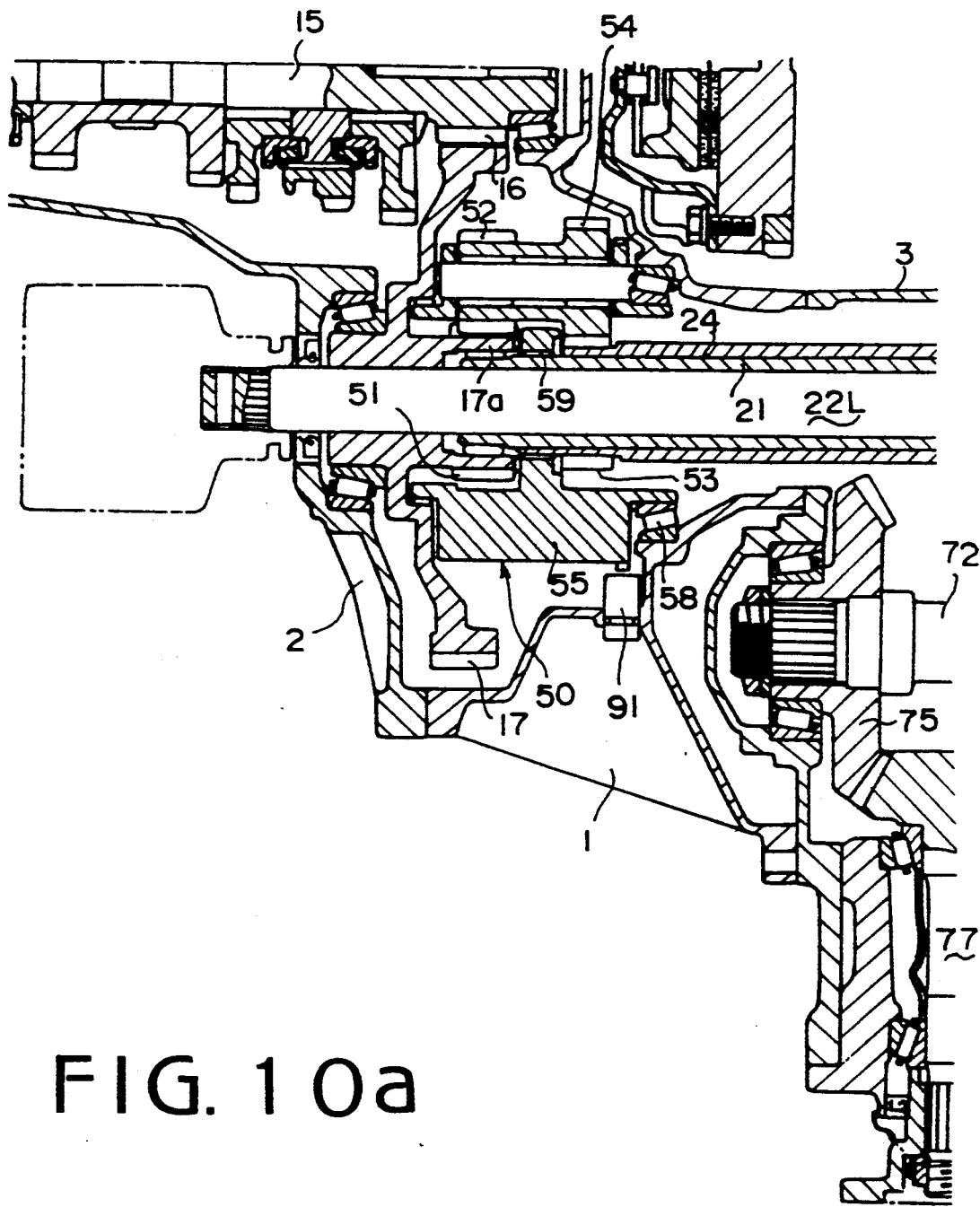
FIGS. 10a, and 10b show a sectional view of the central differential and fluid operated multiple-disk clutch in a third embodiment.
Figure 10B:
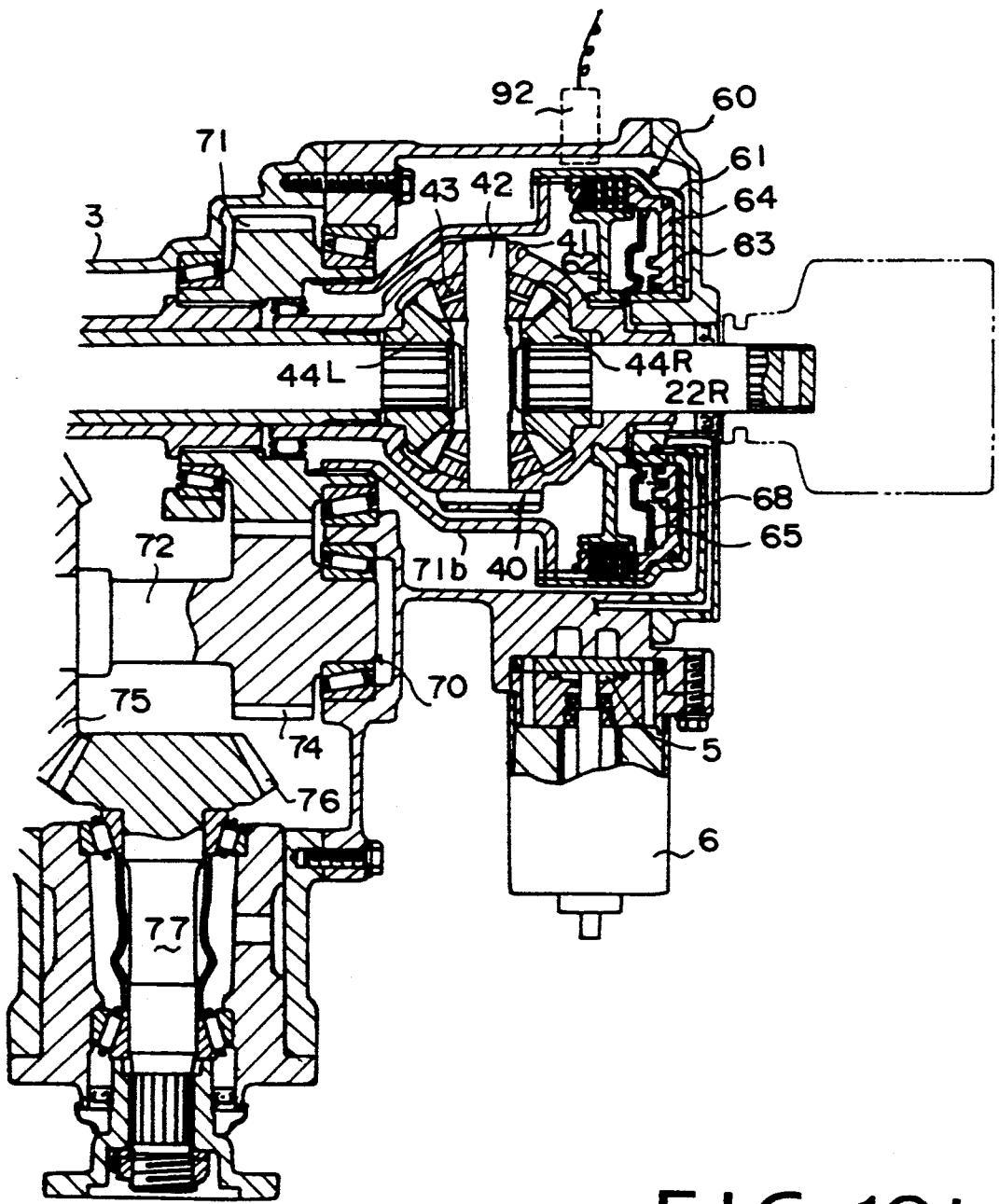

In the third embodiment shown in FIGS. 10a and 10b, the central differential 50 is disposed at a substantially central portion with respect to the width of the vehicle and the front differential 40 is disposed in the transfer case 3 at the same side as the engine. The final gear 17 which is rotatably mounted on the left axle 22L has a sleeve (hollow shaft) 17a. The first sun gear 51 of the central differential 50 is securely mounted on the sleeve 17a and the carrier 55 is securely mounted on the first output shaft 21. The second sun gear 53 is securely mounted on the second output shaft 24 mounted on the first output shaft 21. The first output shaft 21 which is extended to the right is connected to the differential case 41 of the front differential 40. The transfer drive gear 71 is securely mounted on the second output shaft 24. The drive drum 61 of the multiple-disk clutch 60 is disposed on the right side of the front differential 40 and connected to transmitting member 71b integral with the transfer drive gear 71. The driven drum 62 is securely mounted on the differential case 41 of the front differential 40. The other construction and operation are the same as those of the first embodiment.

In the second and third embodiments, the front-wheel speed sensor 91 and the rear-wheel speed sensor 92 are disposed at positions appropriate for detecting the front-wheel speed $N_F$ and rear-wheel speed $N_R$, respectively.

FIGS. 11a to 11f show other examples of the central differential 50. In the examples shown in FIGS. 11a, 11c and 11e, the fluid-operated multiple-disk clutch 60 is disposed between the carrier 55 and the input shaft 20 of the central differential 50. Thus, a bypass system 101 comprising the clutch 60 is provided for a transmitting system from the input shaft 20 to the first output shaft 21 and to the second output shaft 24 through the central differential 50. When the rear wheels 28L, 28R slip, the speed difference in the central differential 50 becomes: the rear-wheel speed $N_R$ > the speed of the input shaft 20 > the front-wheel speed $N_F$.

A part of the input torque of the input shaft 20 is directly transmitted to the first output shaft 21 through the drive drum 61 of the clutch 60 and the carrier 55 in accordance with the clutch torque Tc. The remaining torque is transmitted to the second output shaft 24 from the first sun gear 51 through the first and second pinions 52 and 54 and the second sun gear 53. The front-wheel torque $T_F$ and the rear-wheel torque $T_R$ are as follows.

$T_F = 0.38 (Ti - Tc) + Tc$ $T_R = 0.62 (Ti - Tc)$

Since the clutch torque Tc is zero in the no slip state, the torque distribution ratio of the front and rear wheels is $T_F : T_R = 38:62$. When the rear wheels slip to produce clutch torque Tc, the input torque Ti proportional to the clutch torque Tc is directly transmitted to the front wheels 23L, 23R. The input torque Ti transmitted to the front wheels 23L, 23R becomes large with an increase of the clutch torque Tc.

Figure 11A:
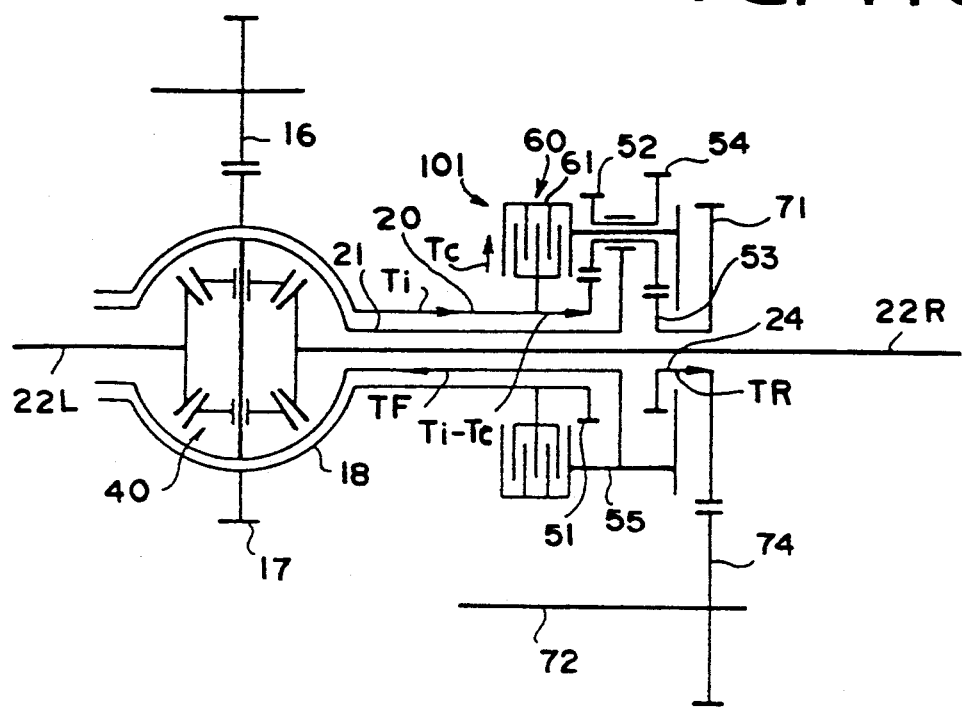
Figure 11B:
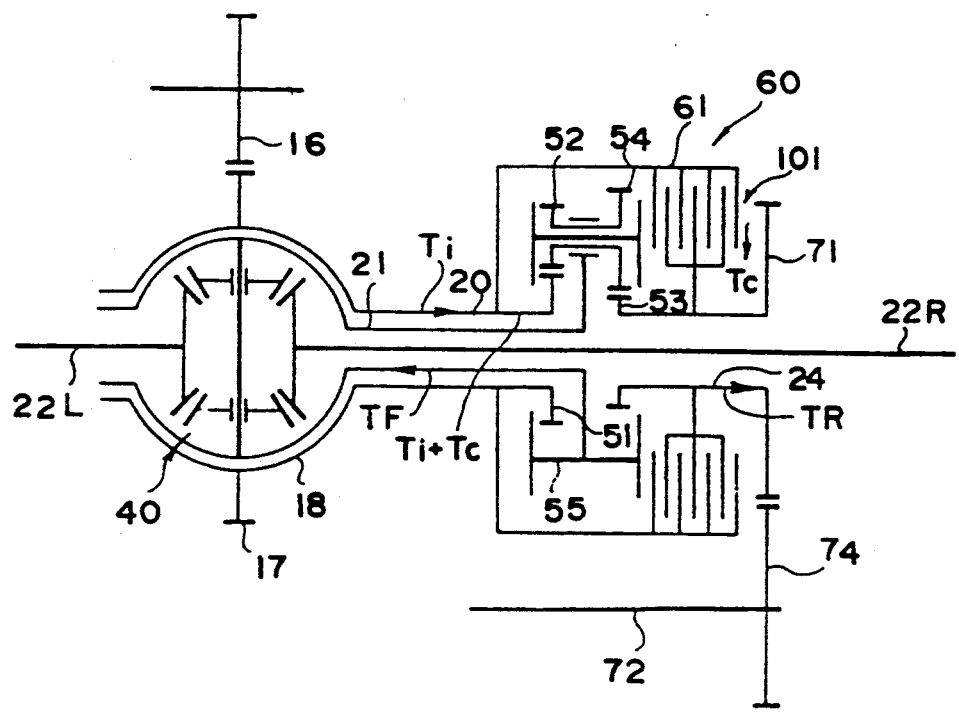
Figure 11C:
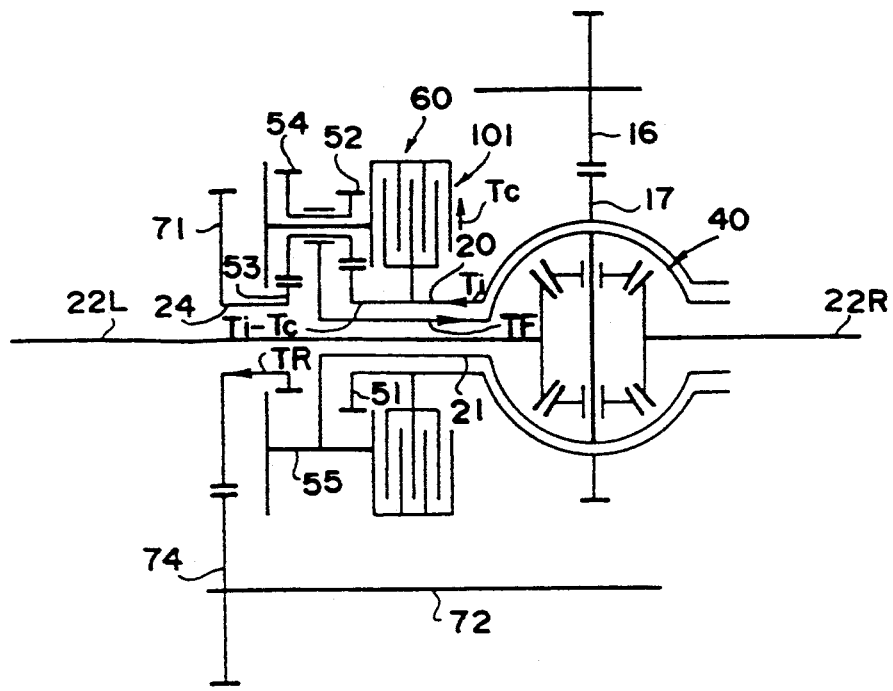
Figure 11D:
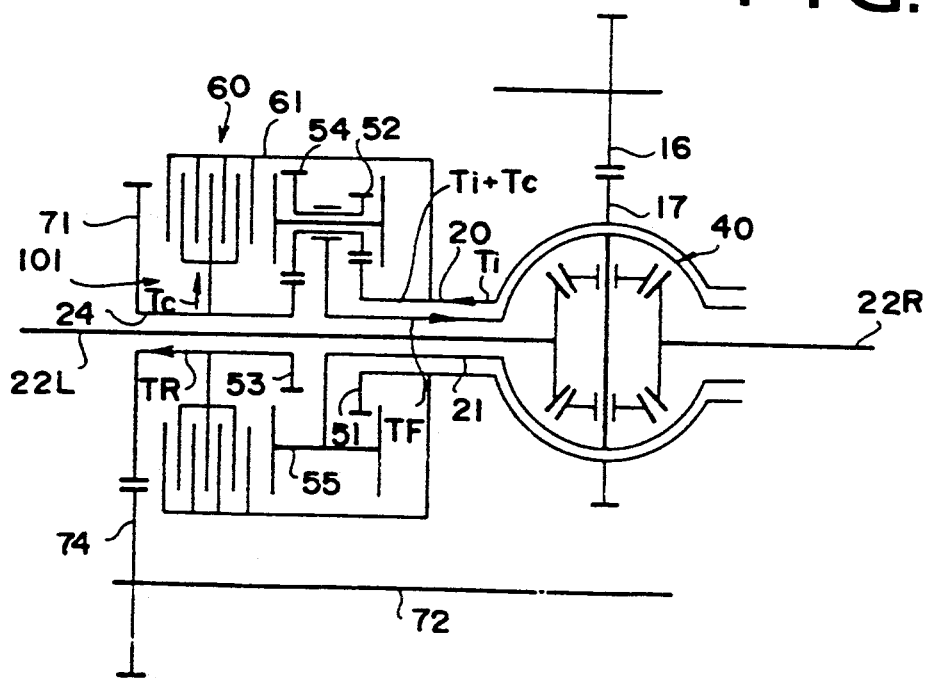
Figure 11E:
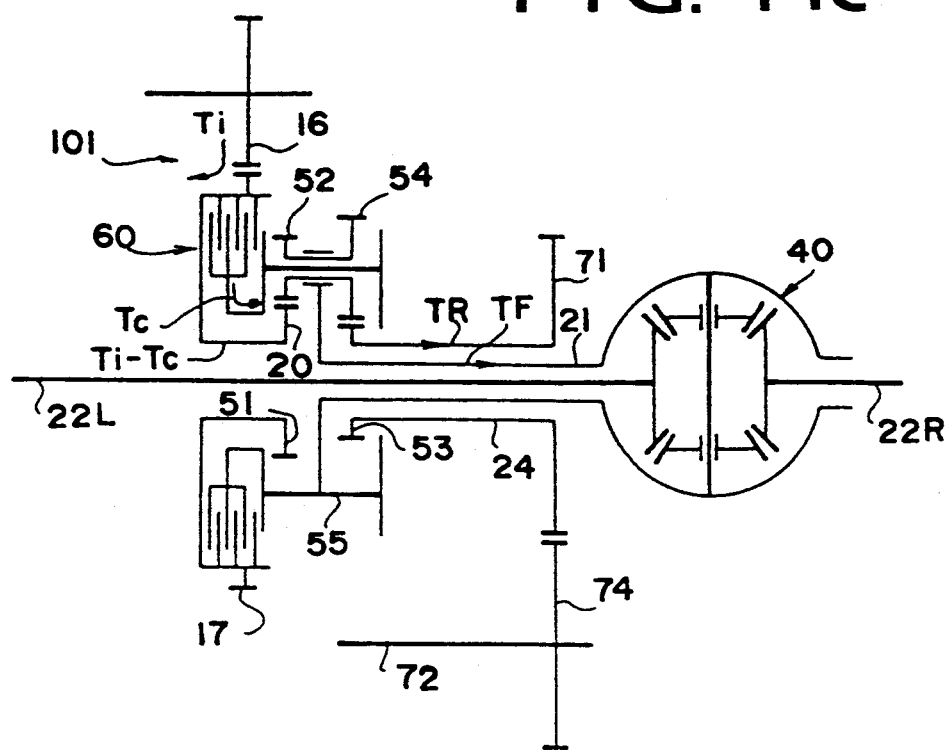
Figure 11F:
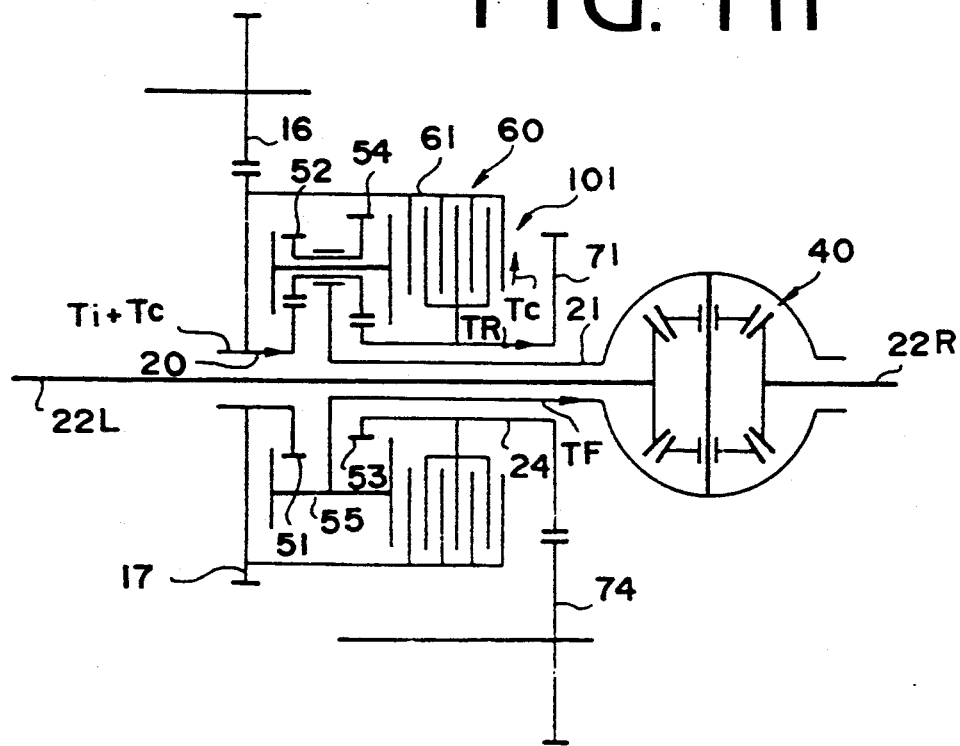

In each central differential 50 of FIGS. 11b, 11d and 11f, the input shaft 20 is provided with a transmitting member extending therefrom and passing through the central differential 50 and connected with the drum 61 of the clutch 60 The multiple-disk clutch 60 is disposed between the second sun gear 53 and the input shaft 20. Thus, the bypass system 101 comprising the clutch 60 is provided for the input shaft 20. The front-wheel torque $T_F$ and the rear-wheel torque $T_R$ are as follows.

$T_F = 0.38 (Ti + Tc)$ $T_R = 0.62 (Ti + Tc) - Tc$

When the rear wheels 28L, 28R slip, the torque corresponding to the sum of the clutch torque Tc and the input torque Ti is transmitted to the front wheels 23L, 23R.

The system of the present invention can be employed in a four-wheel drive motor vehicle of other types such as a rear wheel drive vehicle with a rear engine.

In accordance with the present invention, the central differential comprises two pairs of sun gears and planetary pinions and a carrier. The standard torque distribution to front wheels 23L, 23R and the rear wheels 28L, 28R is determined by the radii of the pitch circles of the gears and the pinions. Thus, the torque distribution ratio can be set to various values.

Accordingly, a rigid and compact system may be made to distribute larger torque to the rear wheels 28L, 28R than that to the front wheels 23L, 23R, without changing the size of the system. Since the large torque is transmitted to the rear wheels 28L, 28R, steerability is improved and slipping of the wheels is accurately detected, thereby improving acceleration characteristics. In addition, a wide control of the torque distribution can be performed. Thus, operability and driveability of the vehicle are accurately and properly controlled, thereby improving efficiencies thereof.

The central differential and the fluid-operated multiple-disk clutch are coaxially provided at the rear of the manual transmission in small size. Thus, the central differential can be disposed at any position. Since the input shaft and the output shafts of the central differential are disposed at the central portion of the vehicle, the differential is preferable for a transmission system having coaxially arranged input and output shafts.

The system having the central differential provided in the transmission case can be adapted to a two-wheel drive vehicle. The fluid-operated multiple-disk clutch has a sealed construction, so that it is preferable to lubricate the clutch.

Since parts of the central differential, the multiple disk clutch and the transfer device are disposed in the transmission case, the system becomes compact, thereby enabling the case to be strengthened. Thus the system is advantageous in reducing oscillation noise. Since the transmission system does not overhang from the engine, the engine can be arbitrarily designed without obstruction.

Since the central differential is provided adjacent the transmission, the power train can be simplified.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling torque distribution to a pair of front wheels and a pair of rear wheels of a motor vehicle having a laterally mounted engine, a transmission directly connected to said engine, a first differential operatively engaged with a drive gear of said transmission for differentiating left and right wheel speed of one of said pairs of wheels, the system comprising a center differential coaxially aligned with said first differential and for differentiating speed of said front wheels and rear wheels, a hydraulic multiple-disk clutch coaxially, operatively connected to said center differential for restricting said differentiating speed of said front wheels and rear wheels, a front wheel speed sensor for detecting front wheel speed and for generating a front wheel speed signal, a rear wheel speed sensor for sensing rear wheel speed and for producing a rear wheel speed signal, a steering angle sensor for detecting steering angle of said vehicle and for producing a steering angle signal, and a shift position sensor for detecting a shift position of said transmission and for generating a shift signal, the improvement in the system which comprises:

a final gear meshed with said drive gear for transmitting power from said engine to said final gear;
   said center differential comprises:
   a first sun gear operatively connected to said final gear;
   a second sun gear rotatable and coaxially aligned with respect to said first sun gear;
   a first pinion meshed with said first sun gear;
   a second pinion coaxially integrally formed with said first pinion and meshing with said second sun gear, said second pinion having a different diameter than that of said first pinion; and
   a carrier carrying said first and second pinions and serving as a planetary gear device without an outside ring gear; and the system further comprising
   control means responsive to said front wheel speed, said rear wheel speed, said steering angle and said shift signals for controlling said members of said clutch so as to control said torque distribution in a wide range in dependency on driving conditions of said vehicle so as to distribute larger torque to said rear wheels than to said front wheels by selecting an optimum value appropriate for any driving condition.

2. The system according to claim 1, wherein said carrier is connected to said first differential.

3. The system according to claim 1, wherein said second sun gear is operatively connected to a multiple-disk member of said clutch.

4. The system according to claim 3, wherein said carrier is coaxially connected to another multiple-disk member of said clutch.

5. The system according to claim 4, wherein one of said members of said clutch is operatively connected to said one of said pair of wheels via said first differential and the other of said members of said clutch is operatively connected to the other of said pair of wheels.

6. The system according to claim 5, wherein said one member of said clutch is connected to said carrier.

7. The system according to claim 6, further comprising
   a tubular shaft, coaxial to said sun gears, connects said carrier and said one member of said clutch to said first differential.

8. The system according to claim 1, wherein
   said final gear is provided on a member which is adjacent an outer periphery of said first differential.

9. The system according to claim 8, wherein said center differential comprises a hollow shaft coaxially, operatively connected at one end to said final gear via said member and extending to said center differential,
   said first sun gear is formed on another end of said hollow shaft.

10. The system according to claim 1, wherein the control means comprises a hydraulic circuit for supplying pressurized oil to a fluid-operated said multiple-disk clutch, and a control unit for controlling the pressure of oil supplied to the clutch.

11. The system according to claim 10, wherein the hydraulic circuit comprises an oil pump, a pressure regulator valve for regulating pressure of oil supplied from the oil pump to produce a line pressure, and a clutch control valve for controlling the oil supplied to the clutch, and a solenoid operated duty control valve for controlling the pressure of the oil supplied to the clutch control valve, the control unit comprises a slip ratio calculator for calculating slip ratio of the rear wheels to the front wheels in accordance with the ratio of the front-wheel speed to the rear-wheel speed, clutch pressure setting means responsive to the slip ratio for providing a clutch pressure, and duty ratio providing means responsive to the clutch pressure for producing pulses having a duty ratio corresponding to the clutch pressure to the duty control valve for controlling the pressure of oil.

* * * * *